United States Patent [19]

Kazaoka et al.

[11] Patent Number: 4,607,827
[45] Date of Patent: Aug. 26, 1986

[54] SEAT FOR VEHICLES

[75] Inventors: Kenichi Kazaoka, Nagoya; Hiroshi Okazaki, Cheryu, both of Japan

[73] Assignee: Aisin Seiki Kabushiki Kaisha, Japan

[21] Appl. No.: 637,068

[22] Filed: Aug. 2, 1984

[30] Foreign Application Priority Data

Aug. 3, 1983 [JP] Japan .............................. 58-142034

[51] Int. Cl.$^4$ .............................. F16F 3/02; A47C 7/28
[52] U.S. Cl. ........................................ 267/107; 5/247
[58] Field of Search .................... 5/247; 267/102, 103, 267/104, 107, 109, 110

[56] References Cited

U.S. PATENT DOCUMENTS

| 2,934,133 | 4/1960 | Pawlikowski | 267/107 |
| 3,361,423 | 1/1968 | Gniech et al. | 267/107 |
| 3,612,505 | 10/1971 | Bond | 267/107 |

FOREIGN PATENT DOCUMENTS 533113 11/1956 Canada .............................. 267/107

Primary Examiner—Duane A. Reger
Attorney, Agent, or Firm—Finnegan, Henderson, Farabow, Garrett & Dunner

[57] ABSTRACT

An improved seat which is mounted on forward and rearward pairs of brackets in a vehicle. The seat includes a spring frame having an arrangement of seat springs supporting a seat cushion including a cushion spring extending between opposite ends of the spring frame. A pair of forward and rearward connecting members, which are spaced apart, interconnect the forward and rearward brackets. A pair of forward springs connect the front portion of the spring frame and a rear portion of the cushion springs to the forward connecting member. The forward springs are pivotably connected to the forward connecting member. A pair of rearward springs connect the rear portion of the spring frame and the rearward connecting member. The spring frame is divided into a forward arrangement of seat springs and a rearward arrangement of seat springs. The cushion springs extend along opposite sides of the upper portion of the seat springs and connect the front and rear portions of the spring frame.

9 Claims, 4 Drawing Figures

SEAT FOR VEHICLES

BACKGROUND OF THE INVENTION

FIELD OF THE INVENTION:

The present invention relates to a seat, and more particularly to a seat for vehicles.

DESCRIPTION OF THE PRIOR ART:

In a conventional seat such as in the Japanese patent publication No. 56 (1981)-1093, a seat spring for supporting a seat cushion is connected to a seat cushion pan by utilizing forward and rearward springs. In such an arrangement the center of gravity of the seated passenger is normally located farther rearward than the supporting center of the seat spring. Accordingly, the seated passenger tends to slide forward, causing the forward spring of the seat to become tensioned, thereby forming a firmer support surface. This support surface, i.e. the springs beneath the seat cushion, resists the weight of the seated passenger. This built-in resistance exists even if the seated passenger sits on a front portion of the seat.

It is generally desirable that the portion of the seat contacting the seated passenger's hip be firm and that the forward portion of the seat contacting the passenger's femur be sufficiently flexible to facilitate depression of the foot pedals. However, when the seated passenger in the normal position on the conventional seat operates a pedal, there is generally such built-in resistance acting against the femur of the passenger to interfere with operation of the pedals.

SUMMARY OF THE INVENTION

An object of the present invention is therefore to provide an improved seat for vehicles which obviates the aforementioned drawbacks of the described conventional seat.

A further object of the present invention is to provide an improved seat for vehicles which is relatively simple in construction and lightweight.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purposes of the invention as embodied and broadly described herein, the cushioned vehicle seat of the present invention includes a spring frame having an arrangement of seat springs for supporting the seat cushion, a pair of forward and rearward connecting members for interconnecting pairs of the forward and rearward brackets mounted on a lower side of the seat, a forward spring for connecting a front portion of the spring frame and a portion of the seat springs rearwardly therefrom to the forward connecting member, the forward spring being pivotable on the forward connecting member, a rearward spring for connecting a rear portion of the spring frame and the rearward connecting member, the spring frame being divided into a forward arrangement of seat springs and a rearward arrangement of seat springs, and a pair of substantially horizontal cushion springs extending along the opposite sides of the upper portion of the seat spring and connecting the forward and rearward ends of the spring frame.

The accompanying drawings, which are incorporated in and constitute a part of this specification, illustrate one embodiment of the invention and, together with the description, serve to explain the principles of the invention.

DETAILED DESCRIPTION OF THE PREFERRED EMBODIMENT

Figure 1:
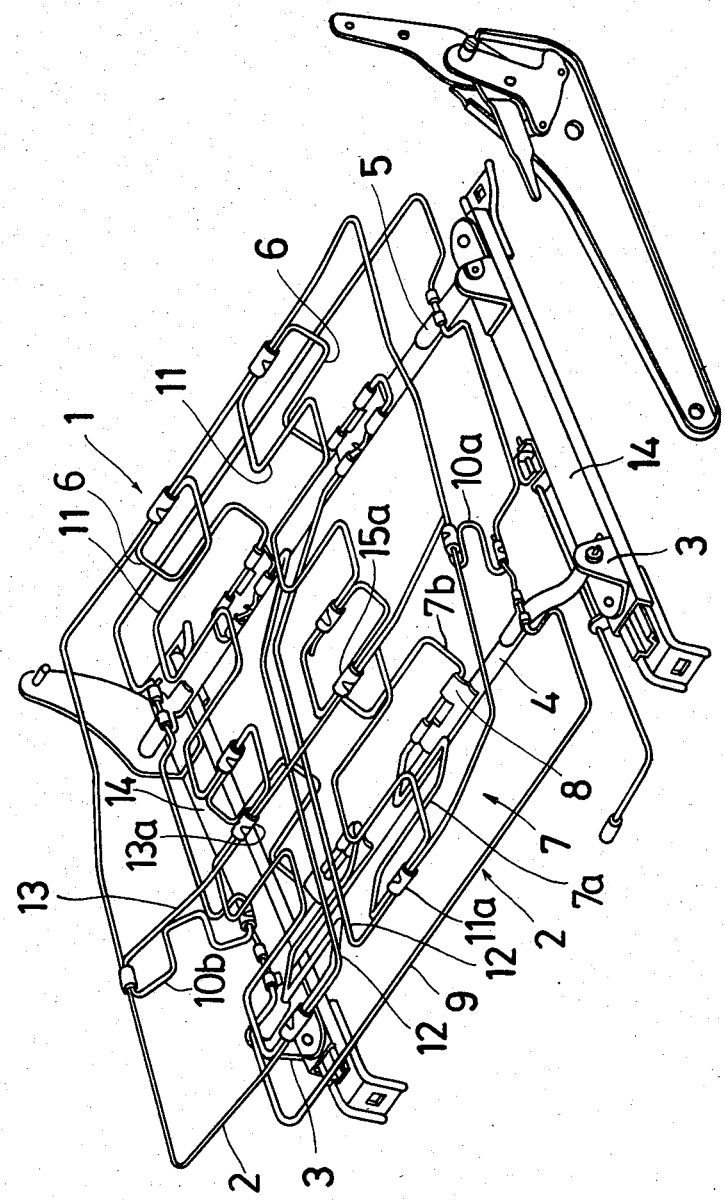
FIG. 1 is a perspective view which shows a presently preferred embodiment of a seat for vehicles constructed according to the present invention.

Referring now to FIG. 1, reference numeral 1 denotes a seat which includes a spring frame 2 having an arrangement of seat springs interconnected therebetween for supporting a seat cushion. The seat springs includes cushion springs 11 extending between the forward and nearward portions of the spring frame 2. A forward and rearward connecting member 4 and 5 interconnect right and left brackets 3 slidably based on the floor of the vehicle, as known in the art. The arrangement of seat springs includes a pair of aligned rearward springs 6 which connect the rear portion of the spring frame 2 to rearward connecting member 5. The rearward springs 6 are pivotably supported on the rearward connecting member and include a series of bends, e.g. a snaked configuration. As shown in FIG. 1, each rearward spring 6 has a straight portion pivotably mounted to the rearward connecting member 5 from which the end portions first incline rearwardly before bending parallel to said straight portion, then bending rearwardly again, and finally bending parallel to said straight portion and into contact with spring frame 2. The final portion of rearward springs 6 is pivotably connected to the rearward portion of spring frame 2. The arrangement of seat springs also includes a pair of aligned forward springs, generally designated by the reference numeral 7, connecting the forward portion of the spring frame 2 with individual cushion springs 11 through forward connecting member 4, which interconnects right and left brackets 3. Forward springs 7 generally have the form of a linear series of reversible S-shapes. The forward springs 7 have a segment 7a which connects the front portion of spring frame 2 to the forward connecting member 4. Forward spring 7 also consists of an auxiliary segment 7b, which extends from connecting member 4 to a portion of each of the cushion springs 11 extending rearward from the front portion of spring frame 2. The portion of the cushion springs 11 contacting auxiliary segment 7b is approximately one-third the length of the seat measured from the front of spring frame 2. A stopper 8, which is attached to connecting member 4, connects forward spring 7 and connecting member 4, permitting the forward spring 7 to be rotatably positioned within stopper 8.

A lower frame 9 is mounted substantially beneath spring frame 2 and interconnects forward and rearward connecting members 4 and 5. Lower frame 9 and spring frame 2 are connected by resilient seat spring members 10a and 10b, which are positioned between forward and rearward connecting members 4 and 5.

Spring frame 2 circumscribes the base of seat 1 and includes a rear section, a pair of side sections and a pair of substantially identical front sections. Each front section extends almost to the center of the front portion of seat 1 forming opposing ends. A pair of substantially parallel linear extensions 12 are connected to the opposing ends and extend from the forward end of spring frame 2 to the rearward connecting member 5. Linear extensions 12 contain a forward and rearward portion. The forward portions of linear extensions 12 are substantially horizontal, whereas the rearward portions are bent downward toward rearward connecting member 5. Thus, spring frame 2 and linear extensions 12 form separate but substantially identical sections on each side of seat 1.

Figure 2:
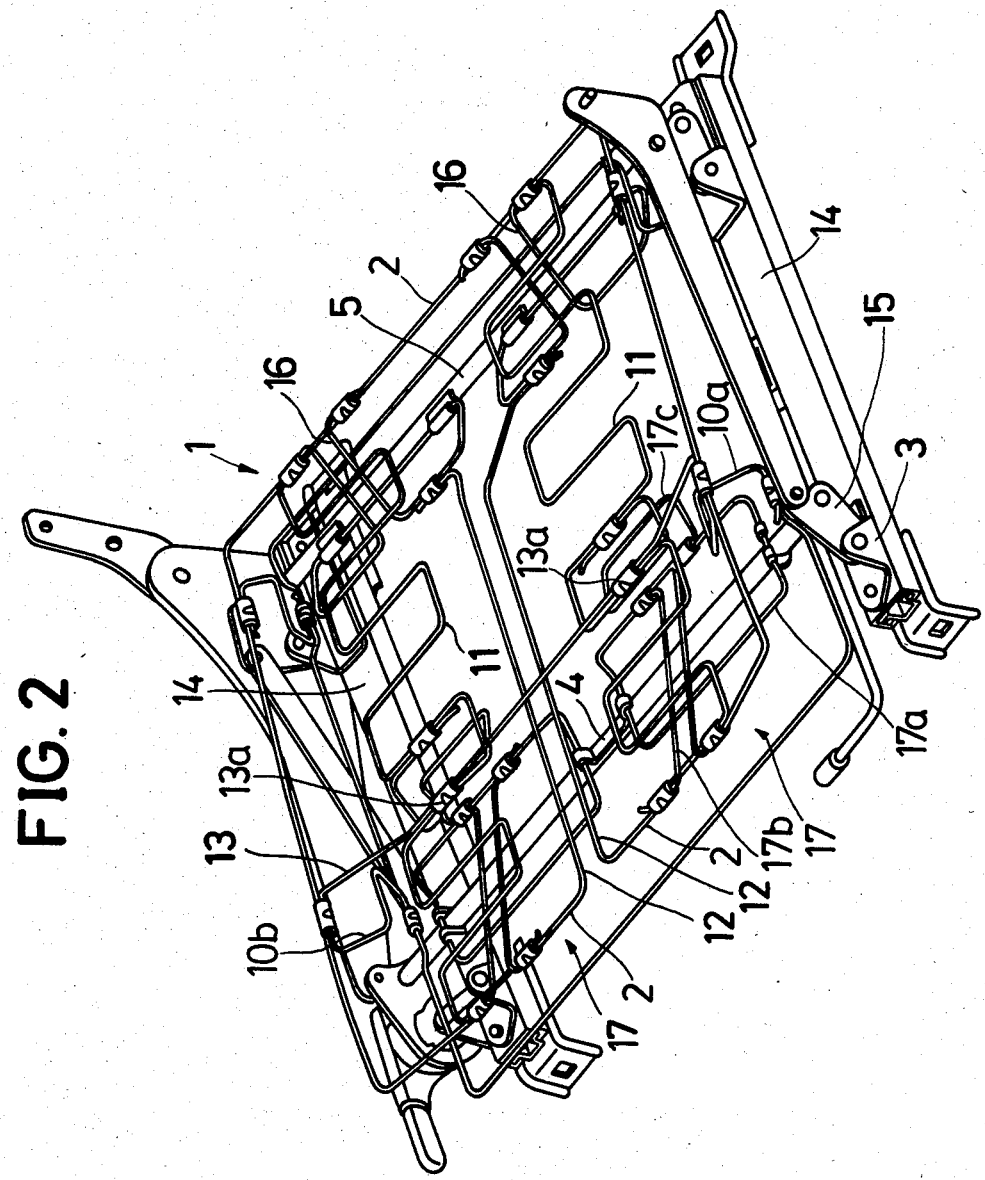
FIG. 2 is a perspective view of the construction of the seat spring and supporting springs of the present invention incorporating a variation in the forward and rearward spring connections.

The pair of cushion springs 11 shown in FIGS. 1 and 2 extend along opposite sides of the upper portion of the seat springs and connect the front and rear sections of spring frame 2. Each of the cushion springs 11 is positioned on opposite sides of seat 1 between one of the linear extensions 12 and the corresponding side section of spring frame 2. Cushion springs 11 have the form of a linear series of S-shapes. Generally, a stopper 11a is used to pivotably attach spring frame 2 and each of the cushion springs 11.

Spring frame 2 is also interconnected by a lateral extension 13, which extends between opposite sides of spring frame 2. Lateral extension 13 and the auxiliary segment 7b substantially divides spring frame 2 into a forward arrangement of seat springs and a rearward arrangement of seat springs. The forward arrangement of seat springs includes generally forward spring segments 7a, b, the resilient members 10a, 10b, and a portion of each of the cushion springs 11 extending forward of the connections between the auxiliary segment 7b and the cushion spring 11. The rearward arrangement of springs includes the rearward spring 6 and each of the cushion springs 11 extending rearward of the connection between auxiliary segment 7b and cushion spring 11. Cushion springs 11 are rotatably connected to lateral extension 13 by stopper 13a.

In FIG. 1, the brackets 3 are fixed to upper slides 14. In FIG. 2, brackets 3 are also fixed to upper slides 14; however, the seat is provided with an elevating apparatus 15, as is known in the art.

As disclosed herein, FIG. 2 shows another embodiment of the present invention. There are two pairs of rearward springs 16 each of which forms a substantially horizontal loop which is rotatably attached to rearward connecting member 5. Opposing ends of each rearward spring 16 are inclined rearward and upward in a substantially parallel arrangement and are individually connected to the rear section of spring frame 2.

As shown in FIG. 2, each forward spring 17 forms a substantially rectangular loop 17a which is slidably and rotatably attached to connecting member 4. The forward springs 17 also include separate pairs of substantially parallel spring sections 17b which extend from the rearward portion of loop 17a and connect to the front end of spring frame 2. Further, each of forward springs 17 includes a vertical extension 17c having a snaked configuration connecting the rearward portion of loop 17a and cushion spring 11.

As shown in FIG. 2, each linear extension 12 is connected to its rearward spring 16. The horizontal portion of linear extension 12 remains substantially parallel to the horizontal portion of rearward spring 16.

As viewed in FIGS. 1 and 2, forward springs 7 (FIG. 1) and 17 (FIG. 2) are movably connected to forward connecting member 4. Further, spring frame 2 is divided into left and right sections with separate cushion springs 11 extending from front to rear on each side of seat 1. Under the weight of a seated passenger, therefore the forward springs 7 and 17 on both sides of seat 1 in FIGS. 1 and 2 can slide outwardly along the forward connecting member and return to their normal position when the weight is removed.

Figure 3:
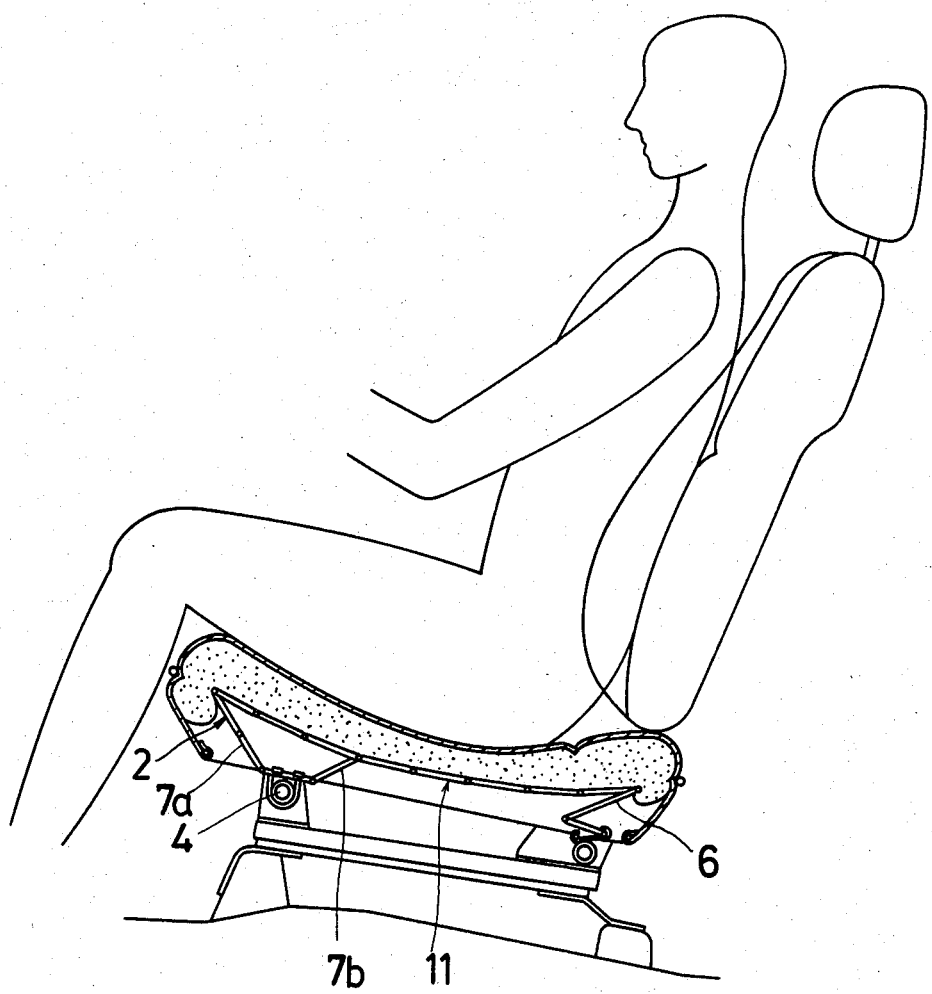
FIG. 3 is a sectional view of the seat having the rearward spring of FIG. 2 supporting a seated passenger.

In FIG. 3, forward spring 7 is shown supporting seat springs at two points, namely, the front end of the spring frame 2 and a portion of cushion springs 11 approximately one-third the length of seat 1 measured from the front end of spring frame 2. This construction permits most of the weight of the seated passenger to be received by the rearward arrangement of seat springs arranged between auxiliary portion 7A of forward spring 7 and the rearward spring 6.

Figure 4:
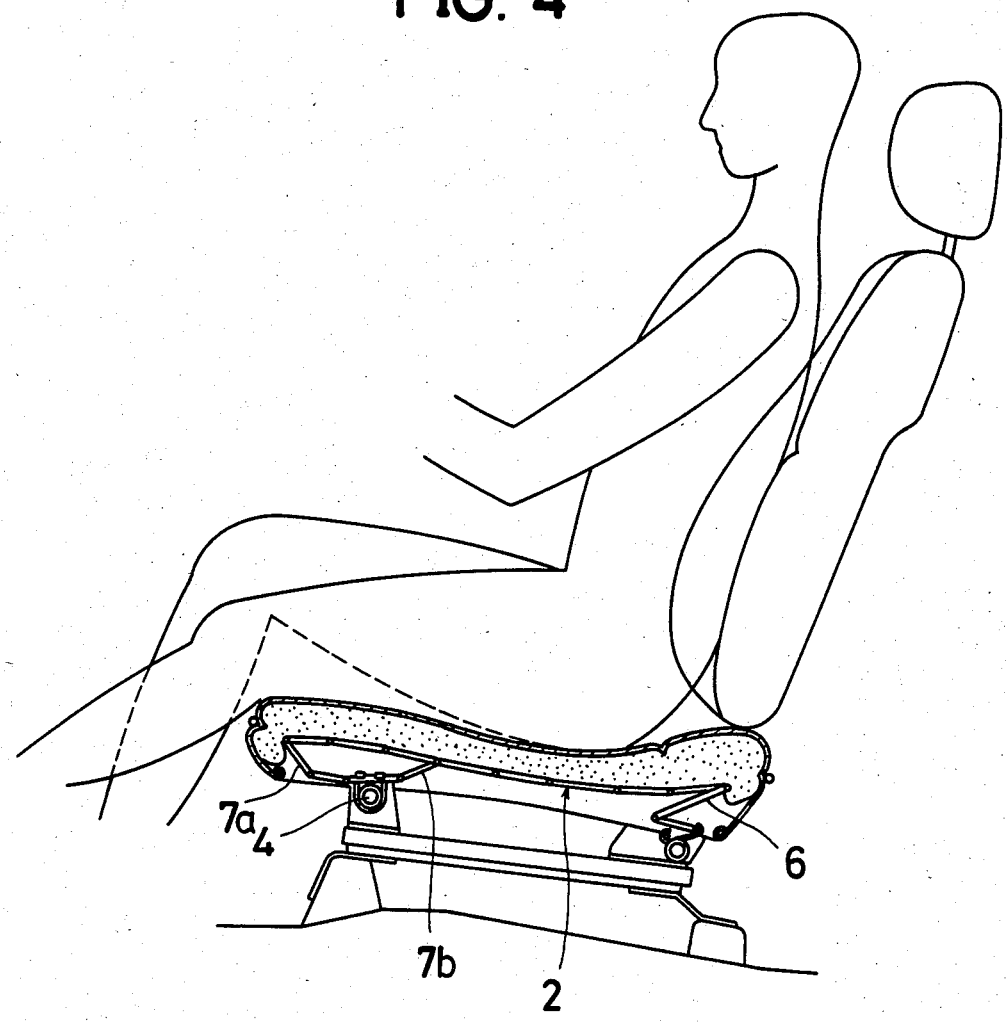
FIG. 4 is a view similar to FIG. 3, showing the state of the seat of FIG. 3 during operation of a pedal.

In FIG. 4, operation of the front portion of the seat 1 upon the pedal operation of the seated passenger is shown. As clearly viewed from this FIG. 4, the front portion of both sides of seat 1 easily responds to weight imposed by the movement of either leg of the seated passenger.

In operation, the vehicle seat of the present invention provides comfortable support for the seated passenger while not causing excessive resistance to movement of either leg while actuating the foot pedals. The essentially identical arrangement of seat springs on each side of seat 1 allows spring frame 2 to respond easily to a shift in weight caused by the movement of either leg. In addition, the configuration of forward springs 7 (FIG. 1) and 17 (FIG. 2), in conjunction with lateral extension 13, permits the forward portion of the seat to operate substantially independent of the rearward arrangement of springs. This configuration reduces the force acting on the forward springs and enhances flexible operation of that portion of the seat.

By the foregoing, there has been disclosed a preferred form of seat for vehicles constructed in accordance with the present invention. It will be appreciated that various additions, substitutions, modifications and omissions may be made thereto without departing from the spirit of the invention.

What is claimed is:

1. In a seat for mounting on forward and rearward pairs of brackets in a vehicle, the seat having a cushion for supporting a seated passenger, the improvement comprising:

spring frame means having an arrangement of seat spring means for supporting said seat cushion, a pair of forward and rearward connecting members for interconnecting pairs of said forward and rearward brackets, said connecting members being spaced apart on a lower side of said seat, said seat spring means including a pair of cushion springs extending along opposite sides of the upper portion of said spring frame means and connecting the front and rear portions of said spring frame means, said seat spring means also including a pair of forward springs for connecting the front portion of said spring frame means and a portion of each of said cushion springs rearwardly therefrom to said forward connecting member, said forward springs being pivotable on said forward connecting member, said seat spring means also including a pair of rearward springs for connecting the rear portion of said spring frame and said rearward connecting member, and said pair of forward springs substantially defining a forward arrangement of seat springs and a rearward arrangement of seat springs, wherein the seated passenger is substantially supported along said rearward arrangement of said seat springs.

2. The improvement of claim 1 further comprising a pair of substantially parallel linear extensions extending from the front portion of said spring frame to said rearward connecting member, said linear extensions having forward and rearward portions, the forward portion of said linear extensions being substantially horizontal and the rearward portions being directed downward toward said rearward connecting member.

3. The improvement of claim 2, wherein each of said cushion springs are positioned between separate linear extensions and corresponding sides of said frame.

4. The improvement of claim 1, wherein said rearward springs each include a substantially horizontal section, said section being rotatably attached to said rearward connecting member.

5. The improvement of claim 1, wherein said forward springs each include a substantially rectangular-shaped section rotatably and slidably attached to said forward connecting member, said forward springs also having section extending from said rectangular-shaped section to a rearward portion of said cushion springs.

6. The improvement of claim 1, further comprising a lateral extension connecting the opposite sides of said spring frame and defining the forward and rearward sections of said arrangement of seat springs.

7. The improvement of claim 2, further comprising a lateral extension connecting the opposite sides of said spring frame and defining the forward and rearward sections of said arrangement of seat springs.

8. The improvement of claim 3, further comprising a lateral extension connecting the opposite sides of said spring frame and defining the forward and rearward sections of said arrangement of seat springs.

9. The improvement of claim 1, wherein said spring frame means includes an upper frame and a lower frame, said cushion springs extending between front and rear portions of said upper frame, said seat spring means including resilient members connecting said lower frame and said upper frame along opposite sides of said spring frame means.

* * * * *